United States Patent [19]

Sayles

[11] 3,990,369

[45] Nov. 9, 1976

[54] FLEXIBLE, HIGHLY-ADHESIVE ROCKET MOTOR CASE INSULATION

[75] Inventor: David C. Sayles, Huntsville, Ala.

[73] Assignee: The United States of America as represented by the Secretary of the Army, Washington, D.C.

[22] Filed: Mar. 31, 1975

[21] Appl. No.: 563,426

[52] U.S. Cl. .............................. 102/103; 264/3 R; 60/200 A; 60/255
[51] Int. Cl.$^2$ .......................................... F02K 9/04
[58] Field of Search .................... 264/3 R; 102/103; 60/200 A, 255

[56] References Cited
UNITED STATES PATENTS

| | | |
|---|---|---|
| 2,877,504 | 3/1959 | Fox ..................................... 264/3 R |
| 3,056,171 | 10/1962 | Fite ..................................... 264/3 R |
| 3,301,924 | 1/1967 | Bryant et al. ...................... 264/3 R |
| 3,716,604 | 2/1973 | Dehm ................................. 264/3 R |
| 3,904,715 | 9/1975 | Sieg et al. ......................... 264/3 R |

Primary Examiner—Samuel W. Engle
Assistant Examiner—David Leland
Attorney, Agent, or Firm—Nathan Edelberg; Robert P. Gibson; Jack W. Voigt

[57] ABSTRACT

A rocket motor case liner material that is the reaction product of tung oil with phenolic resins with an added filler selected from tricalcium phosphate, boric acid, or powdered asbestos. When cured the product yields a liner material with a highly wrinkled interior surface having a greatly increased surface area for bond formation with propellant to permit improved propellant-to-liner bond because of mechanical adhesion.

4 Claims, No Drawings

FLEXIBLE, HIGHLY-ADHESIVE ROCKET MOTOR CASE INSULATION

DEDICATORY CLAUSE

The invention described herein may be manufactured, used, and licensed by or for the Government for governmental purposes without the payment to me of any royalties thereon.

BACKGROUND OF THE INVENTION

Solid propellant rocket motors have been designed in many sizes and shapes. The rocket motor includes a motor case which serves as a container for the solid propellant charge referred to as a grain. The general practice in manufacturing solid propellant rocket motors includes providing a motor case liner which insulates the rocket motor case from the burning propellant grain. The grain is required to be securely bonded to the liner to ensure that propellant grain break-up does not take place as a result of the acceleration forces which are built up during the burning phase of the rocket motor. If the grain is not adequately bonded, separation of the liner and propellant can occur, then burning will take place on the liner side of the propellant. This would result in a greatly increased burning surface and motor malfunction due to overpressurization. wherever the strength of the bond between the liner and the grain is inadequate, due to improper mechanical adhesion, a problem area exists. This would cause the development of unequal stresses in the grain during storage which can result in cracking of the propellant grain or separation of the propellant from the liner. Therefore, it is essential that bonding of the grain to the liner is uniform, and that the bond has adequate mechanical adhesion. It is, also, essential that the liner be adequately bonded to the rocket motor case.

A problem in the prior art liners relates to the tendency of the liner material, after cure, to have too smooth an interior surface, and, thereby, result in poor mechanical adhesion between the grain and the liner regardless of whether the grain is cast-in-place and cured, or whether the grain is first cured, and then bonded to the liner after the grain is inserted in the motor case.

An object of this invention is to provide a flexible highly-adhesive rocket motor case liner insulation material which is curable to yield a wrinkled interior surface and thus provide a much larger surface area for bonding to the propellant than is the case with state-of-the-art propellant-liner systems.

Another object of this invention is to provide a flexible, highly-adhesive rocket motor case liner insulation material that is compounded of ingredients that have low signature characteristics, and which are compatible with cast-in-place solid propellant compositions which form a stronger mechanical adhesive bond because the propellant penetrates into the wrinkled surface because of the increased surface for bond formation, and because of the mechanical interlocking of the propellant within the wrinkles of the liner.

A further object of this invention is to provide a flexible, highly-adhesive rocket motor case liner insulation material which has good bonding characteristics to different types of rocket motor case materials, of the monolithic types (steel, titanium, etc.) or filamentous type (fiberglass composite, graphite composite, etc.).

SUMMARY OF THE INVENTION

The flexible, highly-adhesive rocket motor case liner insulation material of this invention is prepared by reacting tung oil with various (modified/unmodified) phenolic resins. The procedure for manufacturing includes heating the tung oil first with a predetermined amount of phenolic resins at about 500° F for 20–30 minutes under a blanket of inert gas. Second, further reaction is checked or stopped by loading a predetermined amount of phenolic resins to the reaction vessel which is subsequently cooled with circulating water which is pumped thru cooling coils. Finally the insulation resin, thus prepared, is thinned or diluted by dissolving it in a light petroleum naphtha solvent.

A filler selected from tricalcium phosphate (10–20%), boric acid (40–60%) or powdered asbestos (20–30%) is incorporated into the insulation material by roller milling.

This insulation material is applied to the interior surfaces of the motor case, and cured at 140° F for 12–14 hours. The cured liner has a characteristic highly wrinkled surface after being cured to the motor case where it serves as the insulation. When the propellant is cast into the motor, it securely bonds to the liner's wrinkled surface. The mechanical adhesive bond is much stronger than normally obtained because the propellant penetrates into the wrinkled surface to achieve the bond to a greatly increased surface area. Because of the much larger surface area that the wrinkled liner presents for bonding to the propellant, a much stronger mechanical bond between liner and propellant ensue than is the case with conventional liners which have a smooth surface for bonding. Prior cast and cured solid propellant grains may also be securely bonded to the wrinkled surface to achieve an improved bond between the propellant and the insulating liner. Bonding of the cured grain to the liner-insulation may be accomplished by standard grain-to-insulation bonding techniques which include employing a compatible adhesive that is applied in a thin layer to the grain and highly wrinkled surface, and subsequently cured to yield a void-free bond. Bonding may also be accomplished by applying a thin layer of uncured insulation material of this invention to the grain and wrinkled surface, and subsequently curing, as specified hereinabove.

DESCRIPTION OF THE PREFERRED EMBODIMENT

A wrinkled liner prepared from tung oil reacted with modified/-unmodified phenolic resins results in a greatly increased surface area for bond formation with either cast-in-place propellant that is cured in the rocket motor to a grain or a separately cured grain that is inserted into motor case, and bonded to the wrinkled liner.

The procedure for manufacturing wrinkled liner composition comprises reacting (in a container or kettle provided with heating and cooling devices), tung oil with a first predetermined amount of a modified/unmodified phenolic resin, such as Amberol F-7, at a predetermined temperature of about 500° F, and for a predetermined reaction time period of about 20–30 minutes under a blanket of inert gas. Further reaction is checked by loading a second predetermined amount of modified/unmodified phenolic resin such as Cook's HG-40, followed by cooling the kettle with circulating water. The resin product is thinned with a light petroleum naphtha solvent.

After the reaction product is thinned to the proper consistency, a filler selected from tricalcium phosphate (10–20%), boric acid (40–60%), or powdered asbestos (20–30%) is incorporated into the product by roller milling.

Since there are many phenolic resins which are commercially available, and which are suitable for use in this invention, only a representative structural formulation to illustrate one of the typical phenolformaldehyde resins (modified/unmodified types) will be shown below.

A typical resole nucleus, or macromolecule polymethylolphenols, is illustrated as follows:

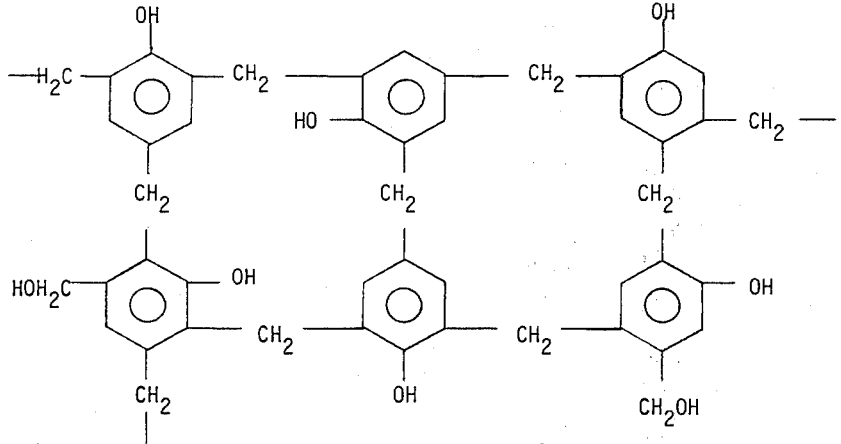

Polymers of this type are obtained directly by carrying out the reaction between phenol and excess formaldehyde in alkaline media.

The insulation material compounded, in accordance with this invention, should have good sprayability, and produce a thick film per spray gun pass. The insulation should be lower cost than the presently used insulants with comparable or superior insulative ability, low exhaust plume signature characteristics and bonding characteristics to different types of motor case materials.

I claim:

1. A liner material for a rocket motor case that has a characteristic highly wrinkled interior surface after being applied and cured to a rocket motor case, said liner material being a flexible, highly-adhesive rocket motor case insulation for bonding a solid propellant grain to a rocket motor case, said liner material being the product prepared by the process comprising:

heating and reacting tung oil with a first predetermined amount of phenolic resins for a predetermined reaction time period of about 20–30 minutes at a predetermined temperature of about 500° F to form a reaction product in a reaction vessel that is provided with means for heating and cooling and that is adapted for operating under a blanket of an inert gas;

adding a second predetermined amount of phenolic resins to check further reaction between said tung oil and said first predetermined amount of phenolic resins;

cooling said reaction vessel and thereafter thinning said reaction product by adding a light petroleum naphtha solvent;

placing said thinned reaction product in a roller mill and adding a predetermined amount of a filler selected from tricalcium phosphate (10–20%), boric acid (40–60%), and powdered asbestos (20–30%); and, roller milling said thinned reaction product to incorporate said selected filler until a uniform mixture is achieved to yield said liner material.

2. The liner material as disclosed in claim 1 wherein said liner material achieves said characteristic highly wrinkled surface after being applied to a rocket motor case and cured at about 140° F for 12–14 hours to form said flexible, highly-adhesive rocket motor case insulation.

3. The liner material as disclosed in claim 2 in combination with a solid propellant composition that is cast into said rocket motor case wherein said solid propellant composition penetrates into said wrinkled surface and forms a strong mechanical adhesive bond to said liner material.

4. The liner material as disclosed in claim 2 in combination with a prior cast and cured solid propellant grain bonded to said wrinkled surface to form a strong mechanical adhesive bond to said liner material.

* * * * *